United States Patent
Durand et al.

(10) Patent No.: US 11,311,120 B2
(45) Date of Patent: Apr. 26, 2022

(54) CONVERTIBLE BREAKFAST STATION

(71) Applicant: Six Continents Hotels, Inc., Atlanta, GA (US)

(72) Inventors: Selma Durand, Brooklyn, NY (US); Nicole Small McGillicuddy, Atlanta, GA (US)

(73) Assignee: Six Continents Hotels, Inc., Atlanta, GA (US)

( * ) Notice: Subject to any disclaimer, the term of this patent is extended or adjusted under 35 U.S.C. 154(b) by 224 days.

(21) Appl. No.: 16/647,392

(22) PCT Filed: Sep. 17, 2018

(86) PCT No.: PCT/US2018/051338
§ 371 (c)(1),
(2) Date: Mar. 13, 2020

(87) PCT Pub. No.: WO2019/055917
PCT Pub. Date: Mar. 21, 2019

(65) Prior Publication Data
US 2021/0120977 A1 Apr. 29, 2021

Related U.S. Application Data

(60) Provisional application No. 62/559,055, filed on Sep. 15, 2017.

(51) Int. Cl.
*A47F 5/00* (2006.01)
*A47B 21/06* (2006.01)
(Continued)

(52) U.S. Cl.
CPC ............ *A47F 5/0025* (2013.01); *A47B 21/06* (2013.01); *A47F 3/001* (2013.01); *A47F 3/145* (2013.01);
(Continued)

(58) Field of Classification Search
CPC ........ A47F 5/0025; A47F 5/0037; A47F 5/04; A47F 5/05; A47F 5/06; A47F 5/16;
(Continued)

(56) References Cited

U.S. PATENT DOCUMENTS 1,635,201 A * 7/1927 Bell ........................ A47F 5/025
211/131.1
2,078,813 A * 4/1937 Sarullo ..................... A47F 3/10
312/125

(Continued)

OTHER PUBLICATIONS

Application No. CA3,075,622, Office Action, dated Apr. 7, 2021, 4 pages.
(Continued)

*Primary Examiner* — Patrick D Hawn
(74) *Attorney, Agent, or Firm* — Kilpatrick Townsend & Stockton LLP (57) ABSTRACT

A convertible table assembly has an item display configuration in which items can be presented for purchasers/guests. The convertible table assembly includes a tabletop assembly and one or more demountable bins for presenting food or other items for purchase, use, and/or consumption by consumers and/or guests. The convertible table assembly also has a table configuration in which the bins are not mounted and one or more power outlets and/or charging and/or communication ports are exposed for connection to electronic devices.

16 Claims, 6 Drawing Sheets

(51) Int. Cl.
 A47F 3/00 (2006.01)
 A47F 3/14 (2006.01)
 A47F 5/04 (2006.01)
 A47F 5/16 (2006.01)
 H02B 1/015 (2006.01)

(52) U.S. Cl.
 CPC .................. *A47F 5/04* (2013.01); *A47F 5/16* (2013.01); *H02B 1/015* (2013.01); *A47B 2021/066* (2013.01); *A47F 2005/165* (2013.01); *H02B 2001/0155* (2013.01)

(58) Field of Classification Search
 CPC .... A47F 3/001; A47F 3/145; A47F 2005/165; A47B 21/06; A47B 2021/066; H02B 2001/0155
 USPC ....... 211/126.1, 126.14, 128.1, 129.1, 131.1, 211/133.3, 133.4
 See application file for complete search history.

(56) References Cited

U.S. PATENT DOCUMENTS

| | | | | |
|---|---|---|---|---|
| 2,375,043 | A | | 5/1945 | Shaffer |
| 2,493,538 | A | * | 1/1950 | Karns .................. A47B 63/062 211/129.1 |
| 2,678,253 | A | * | 5/1954 | Rosenberg ............. A47B 49/00 312/285 |
| 2,887,232 | A | * | 5/1959 | Winter, Jr. ................ A47F 5/02 211/78 |
| 3,164,259 | A | * | 1/1965 | De Caccia ......... A47B 87/0207 211/131.1 |
| 3,181,706 | A | * | 5/1965 | Mandel ..................... A47F 5/05 211/163 |
| 3,361,508 | A | * | 1/1968 | Chassevent ............ A47B 21/06 312/239 |
| 3,942,647 | A | * | 3/1976 | Crosslen ................... A47F 5/02 211/144 |
| 4,056,194 | A | * | 11/1977 | Radek ...................... A47F 5/02 211/131.1 |
| 4,079,841 | A | * | 3/1978 | Castel ...................... A47F 5/08 211/131.1 |
| 4,126,366 | A | * | 11/1978 | Handler .................... A47F 5/02 108/152 |
| 4,736,856 | A | * | 4/1988 | Alneng ..................... A47F 5/05 211/131.1 |
| 4,923,070 | A | * | 5/1990 | Jackie ....................... A47F 1/12 211/126.1 |
| 4,974,734 | A | * | 12/1990 | Merl ......................... A47F 5/04 108/91 |
| 5,213,233 | A | * | 5/1993 | Schmitt .................... G07F 9/10 220/23.86 |
| 5,775,573 | A | | 7/1998 | Smith |
| 5,868,476 | A | * | 2/1999 | Samborn .................. A47F 5/02 312/125 |
| 5,906,284 | A | * | 5/1999 | Hammerstrom ......... B25H 1/04 211/205 |
| 6,206,493 | B1 | * | 3/2001 | Sanchez-Levin ......... A47F 5/02 211/131.1 |
| 6,698,597 | B2 | * | 3/2004 | Marihugh ................. A47F 5/04 211/133.1 |
| 6,837,386 | B1 | * | 1/2005 | Kent ..................... A47B 96/027 108/151 |
| 7,287,652 | B2 | * | 10/2007 | Scholen ................ A47F 5/0846 211/26 |
| 8,172,105 | B2 | * | 5/2012 | Smith ................ B65D 83/0454 220/264 |
| 8,640,891 | B2 | * | 2/2014 | Buttigieg .................. A47F 5/05 211/131.1 |
| 8,692,511 | B2 | * | 4/2014 | Clouser ................. H02J 7/0044 320/107 |
| 8,814,128 | B2 | * | 8/2014 | Trinh ................... F16M 11/041 248/551 |
| 10,206,522 | B2 | * | 2/2019 | Yang ...................... A47F 7/0246 |
| 10,271,646 | B2 | * | 4/2019 | Danville ............... A47B 96/067 |
| 11,160,369 | B2 | * | 11/2021 | Marriott ................ A47F 5/0025 |
| 2004/0055982 | A1 | * | 3/2004 | Jennings .................. A47F 3/14 211/126.2 |
| 2006/0261023 | A1 | * | 11/2006 | Goth ....................... A47F 11/10 211/128.1 |
| 2008/0138477 | A1 | | 6/2008 | Mular et al. |
| 2011/0062294 | A1 | | 3/2011 | Johnson et al. |
| 2012/0019198 | A1 | | 1/2012 | Clouser |
| 2014/0092531 | A1 | | 4/2014 | Trinh et al. |

OTHER PUBLICATIONS

PCT/US2018/051338, "International Preliminary Report on Patentability", dated Mar. 26, 2020, 6 pages.
PCT/US2018/051338, "International Search Report and Written Opinion", dated Jan. 16, 2019, 9 pages.
PCT/US2018/051338, "Invitation to Pay Additional Fees," Nov. 6, 2018.

* cited by examiner

CONVERTIBLE BREAKFAST STATION

CROSS-REFERENCE TO RELATED APPLICATION

The present application is a U.S. 371 Application of international Application No. PCT/US2018/051338, filed Sep. 17, 2018, which application claims the benefit of U.S. Provisional Application No. 62/559,055, filed Sep. 15, 2017, the entire contents of which are hereby incorporated by reference in their entirety for all purposes.

BACKGROUND

Many hotels provide breakfast food items for hotel guests. Such breakfast food items are often displayed for selection by hotel guests. The displayed food items occupy space within the hotel. The breakfast food items are typically only displayed for selection during a breakfast time period. In many instances, however, a portion of the hotel dedicated to the display of the breakfast food items is underutilized outside of the breakfast time period.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A convertible table assembly is described that can be converted from an item display configuration to a table configuration having an accessible power outlet(s) and/or charging and/or communication port(s). In many embodiments, the convertible table assembly includes a tabletop assembly and bins that are detachably mountable to the tabletop assembly. The tabletop assembly can include a power outlet(s) and/or a charging and/or communication port(s). In the item display configuration, the bins are mounted to the tabletop assembly and cover the power outlet(s) and/or the charging and/or communication port(s). In the table configuration, the bins are not mounted to the tabletop assembly and the power outlet(s) and/or the charging and/or communication port(s) are exposed for connection of an electronic device(s). The ability to reconfigure the convertible table assembly between the item display configuration and the table configuration enables efficient use of space occupied by the convertible table assembly in each of the two configurations.

Thus, in one aspect, a convertible table assembly includes a tabletop assembly and a bin. The tabletop assembly includes one or more power outlets and/or one or more charging and/or communication ports. The bin is detachably mountable and configured to display items for selection by a consumer. The convertible table assembly further includes a means for supporting the bin via the tabletop assembly so that the bin extends downward at an angle from a distal end portion of the bin coupled with a central mounting structure to a proximal end portion of the bin.

In another aspect, a convertible table assembly includes a tabletop assembly, one or more power outlets and/or one or more charging and/or communication ports mounted to the tabletop assembly, and bins that are detachably mountable to the tabletop assembly. The convertible table assembly is configurable between an item display configuration and a table configuration. In the item display configuration, the bins are mounted to the tabletop assembly, at least one of a power outlet and/or charging and/or a communication port is covered by the bins, and items can be presented in the bins. In the table configuration, the bins are not mounted to the tabletop assembly and the one or more power outlets and/or one or more charging and/or communication port is exposed for connection to one or more electronic devices.

In another aspect, a convertible table assembly includes a tabletop assembly, a central mounting structure, and bins. The tabletop assembly includes a central mounting structure and one or more power outlets and/or one or more charging and/or communication ports. The bins are detachably mountable to the tabletop assembly via coupling with the central mounting structure so as to cover the one or more power outlets and/or one or more charging and/or communication ports. The one or more power outlets and/or one or more charging and/or communication ports are exposed for connection to at least one electronic device while the bins are not mounted to the tabletop assembly. At least one of the bins is configured to display items for selection and removal from the bin by a customer.

The bins can be mounted to the tabletop assembly using any suitable approach. For example, at least one of the bins can have a distal end portion that is in engagement with the central mounting structure when the bin is mounted to the table.

The bins can be configured to enhance display and removability of the items. For example, at least one of the bins can have a bottom wall that extends between the distal end portion and a proximal end portion of the bin and is sloped downward from the distal end portion to the proximal end portion while the bin is mounted to the tabletop assembly to enhance visibility of items displayed in the bin.

In many embodiments, the bins, while mounted to the tabletop assembly, are engaged with the central mounting structure to support and/or stabilize the bins. For example, the central mounting structure can include a central mounting structure bin interface feature and the distal end portion of the bin can include a distal end interface feature that is in engagement with the central mounting structure bin interface feature while the bin is mounted to the tabletop assembly to inhibit horizontal movement of the distal end portion of the bin relative to the tabletop assembly. Each of the bins can include a distal end support leg. The central mounting structure can include a retention ring. Each of the respective distal end support legs can be engaged with the retention ring while the respective bin is mounted to the tabletop assembly to inhibit horizontal movement of the distal end portion of the bin relative to the tabletop assembly. The central mounting structure can extend upward from a tabletop surface of the tabletop assembly. The central mounting structure can include slots. The distal end portion of the bin can include at least one distally protruding feature that is in engagement with a respective one of the slots while the bin is mounted to the tabletop assembly. At least one of the one or more power outlets and/or charging and/or communication ports can be disposed between an adjacent two of the slots. The central mounting structure can include a central mounting structure bin recess shaped to receive a distally protruding portion of the distal end portion of the bin. The central mounting structure bin recess can define a bottom support surface that is in engagement with the distally protruding portion of the bin while the bin is mounted to the tabletop assembly to vertically support the distal end portion of the bin. The central mounting structure bin recess can define side support surfaces that block horizontal movement of the distal end portion of the bin while the bin is mounted to the tabletop assembly. The distally protruding portion can include a handle for carrying the bin.

The tabletop assembly can be configured to support and restrain the proximal end portion of the bin. For example, the tabletop assembly can include a tabletop bin recess shaped to receive and interface with the proximal end portion to vertically support the proximal end portion and to inhibit horizontal movement of the proximal end portion relative to the tabletop assembly.

The bins can be configured to extend radially away from the central mounting structure. For example, each of the bins can include a distal end portion that is in engagement with the central mounting structure and a proximal end portion that is in engagement with a tabletop of the tabletop assembly when the bin is mounted to the tabletop assembly. Each of the bins can have side walls that extend radially away from the central mounting structure while the bins are mounted to the tabletop assembly. The central mounting structure can include a retention ring. Each of the bins can include a distal end support leg that is in engagement with the retention ring while the bin is mounted to the tabletop assembly. The bins can encircle the central mounting structure while the bins are mounted to the tabletop assembly.

The convertible table assembly can be configured to hold items for use with items selected and removed from the bins. For example, the convertible table assembly can include at least one bag holding member mounted to the tabletop assembly and configured to hold bags for carrying of one or more of items removed from the bins. The central mounting structure can be configured to hold utensils, napkins, and/or condiments.

The convertible table assembly can be configured to so that food items displayed in the bins remain fresh and/or refrigerated or heated. For example, at least one of the bins can include a transparent cover that is reconfigurable between a closed configuration to isolate items in the bin from an environment surrounding the bin and an open configuration that enables placing of items into the bin and removal of items from the bin. The convertible table assembly can include a refrigeration unit configured to refrigerate items in the bin. The refrigeration unit can be mounted to any suitable portion of the convertible table assembly (e.g., the tabletop assembly, one of the bins). The refrigeration unit can include a power cord that is connectable to one of the one or more power outlets to receive power for operation of the refrigeration unit. The convertible table assembly can include a heating unit configured to heat items in the bin. The heating unit can be mounted to any suitable portion of the convertible table assembly (e.g., the tabletop assembly, one of the bins). The heating unit can include a power cord that is connectable to one of the one or more power outlets to receive power for operation of the heating unit.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

In accordance with embodiments, a convertible table assembly is provided. The convertible table assembly has an item display configuration in which items (e.g., food items such as breakfast food items) can be presented for hotel guests. As an example, a number of bins can be provided on a tabletop of the convertible table assembly for presenting food or other items for display/purchase/consumption by consumers. In a table configuration of the convertible table assembly, the bins are not mounted to the tabletop and at least one of a power outlet and/or a charging and/or communication port is exposed for connection to at least one electronic device (e.g., a cell phone(s), laptop computer(s), tablet(s), etc.).

Figure 1:
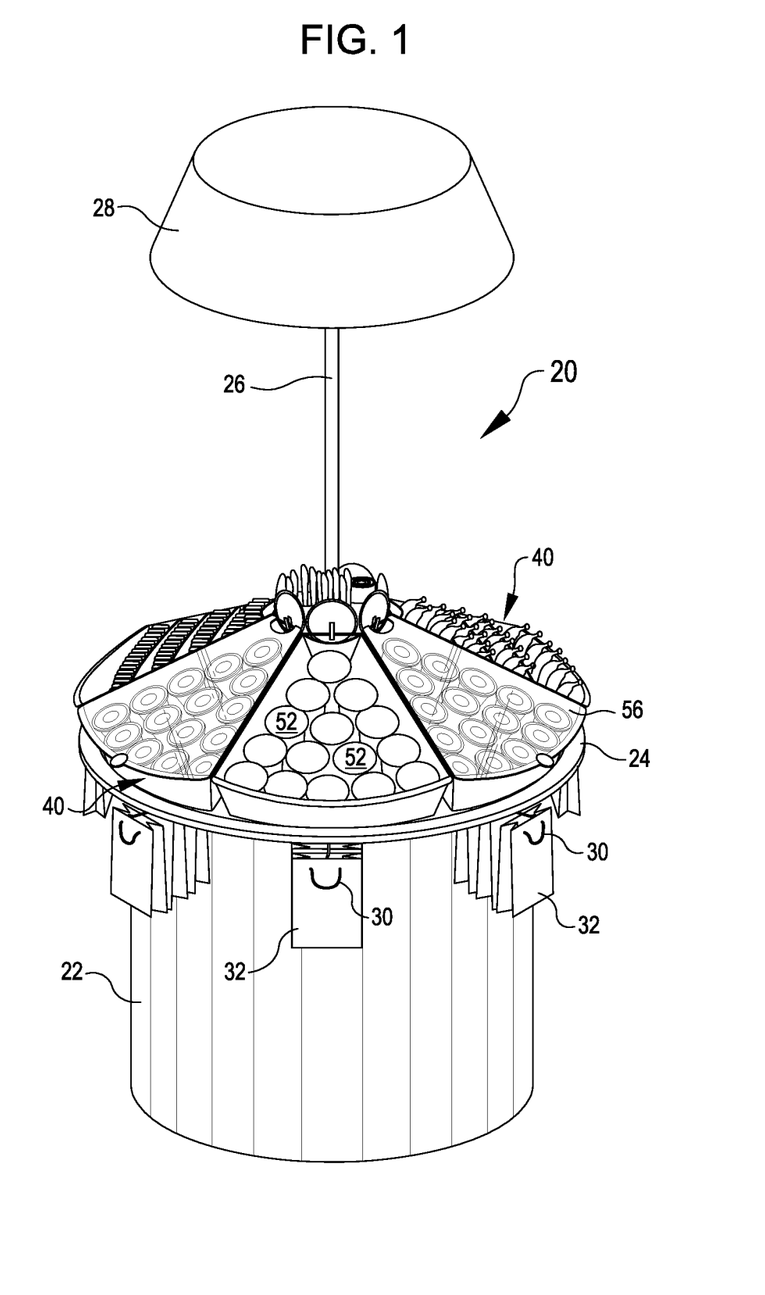
FIG. 1 shows a convertible table assembly in an item display configuration, in accordance with embodiments.

Turning now to FIG. 1, a convertible table assembly 20 is shown in an item display configuration, in accordance with embodiments. The convertible table assembly 20 includes a pedestal 22 and a tabletop assembly 24. In the illustrated embodiment, a pole 26 extends upward from the tabletop assembly 24 to a lampshade 28. Although not shown in FIG. 1, the convertible table assembly 20 includes a source of power, such as a cord plugged into an outlet.

The pedestal 22 can have any suitable configuration that supports the tabletop assembly 24. In the embodiment shown, the pedestal 22 is barrel shaped, with a wood slat finish for decoration. Bag holding members 30 extend outward from the pedestal 22 for receiving bags 32 suitable for carrying one or more items removed from the convertible table assembly 20.

The lampshade 28 and pole 26 are optional, but provide optimal lighting for the tabletop assembly 24. Any suitable type of lighting could be provided, such as surface lighting at the tabletop assembly 24, or embodiments could be formed without lighting, just utilizing lighting within the area where the convertible table assembly 20 is located.

In the illustrated embodiment, a number of bins 40 are mounted on the tabletop assembly 24 in the item display configuration of the convertible table assembly 20. In the embodiment shown, the bins 40 are configured to receive food items 52. The bins 40 can, however, be configured to receive any other suitable items for display and selection by a customer.

Figure 2:
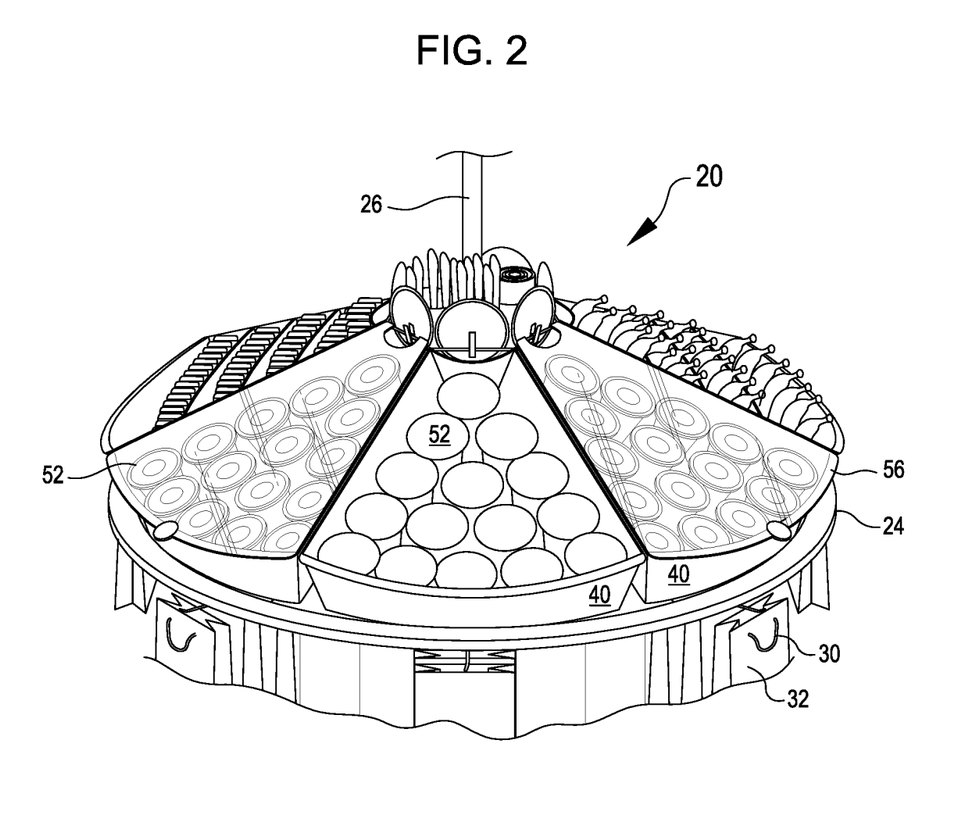
FIG. 2 shows a close-up view of a portion of the convertible table assembly of FIG. 1 in the item display configuration.
Figure 3:
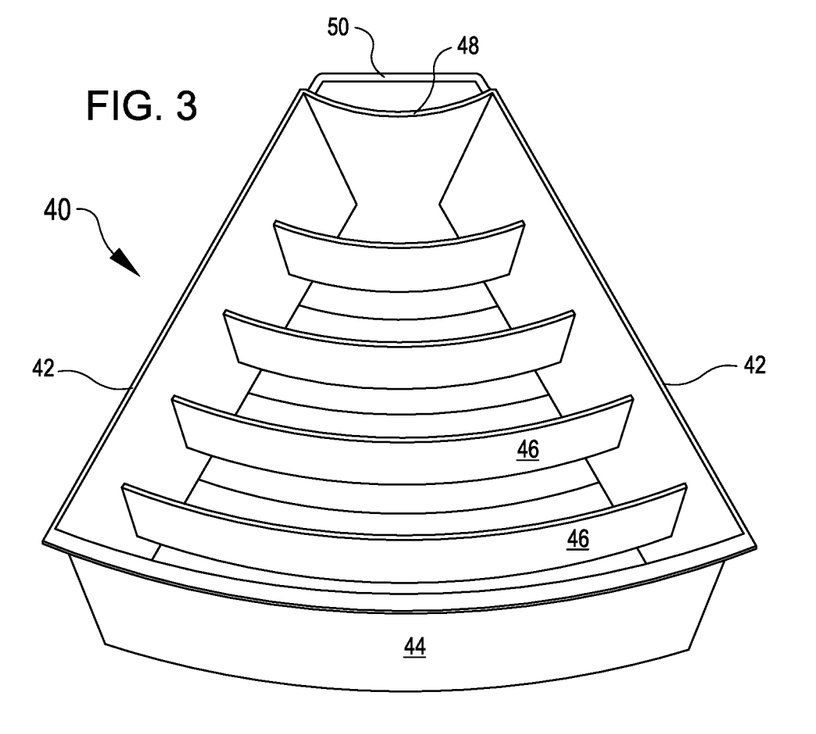
FIG. 3 shows a bin of the convertible table assembly of FIG. 1.

As shown in FIG. 2, the bins 40 can be shaped as sectors, with cutoff distal tips so that the bins 40 can be arranged in a circle around the pole 26. In the embodiment shown, the convertible table assembly 20 can receive seven bins 40, but embodiments could provide any suitable number of bins and the bins could be of any suitable variety of different shapes. Details of one bin 40 are shown in FIG. 3. The bin 40 includes sidewalls 42 extending radially on the outer edges, and a curved front wall 44. Curved section walls 46 divide the bin 40 into multiple arc-shaped compartments. A curved rear wall 48 provides an end for the bin 40. A handle 50 can be positioned just distal of the curve rear wall 48, for easy removal of the bin 40 from the tabletop assembly 24. A bottom wall 54, best shown in FIG. 4, can be provided for the bin 40.

In embodiments, a transparent cover 56, shown in FIG. 1, can be provided for each of the bins 40. The transparent cover 56 can be used to help keep the food items 52 fresh and/or refrigerated or heated within the respective bin 40. One or more of the bins 40 can be insulated so that cold or hot foods placed within the bin remain cold or hot. The bottom wall 54 or other sections of the bin 40 can be or include a hot or cold plate to keep the food items 52 within a suitable temperature range. As another alternative, refrigeration can be provided within the bin 40, such as by a small refrigeration unit or by a conduit that pipes refrigerated fluid (e.g., air, water) to a bin 40. The refrigeration unit can be included within the pedestal 22 or at another suitable location within the convertible table assembly 20. For example one or more of the bins can include a dedicated refrigeration unit and a power cord that can be connected to one of the power outlets 64 when the convertible table assembly 20 is in the item display configuration.

Figure 4:
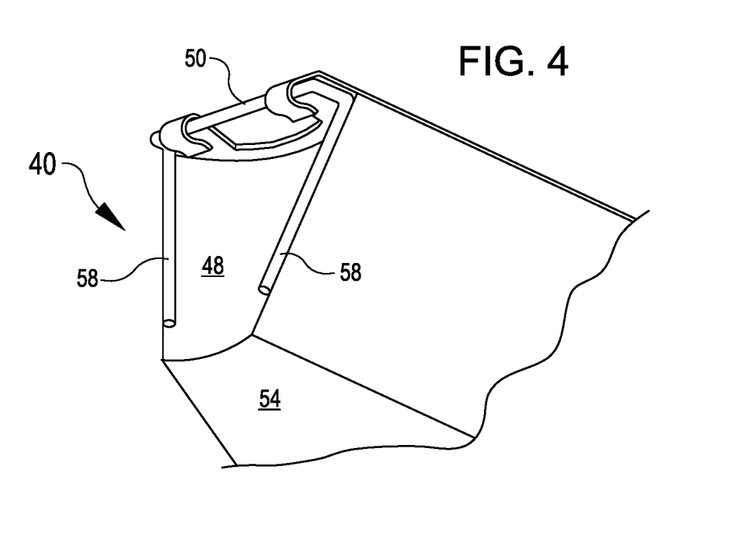
FIG. 4 shows a close-up view of a distal end portion of a bin of the convertible table assembly of FIG. 1.

Details of the handle 50 are shown in FIG. 4. The handle 50 extends distally from the back of the bin 40 and can include rods 58 that extend along a backside of the curve rear wall 48. The handle 50 provides a convenient grip for someone who desires to lift a bin 40 from the tabletop 24.

Figure 5:
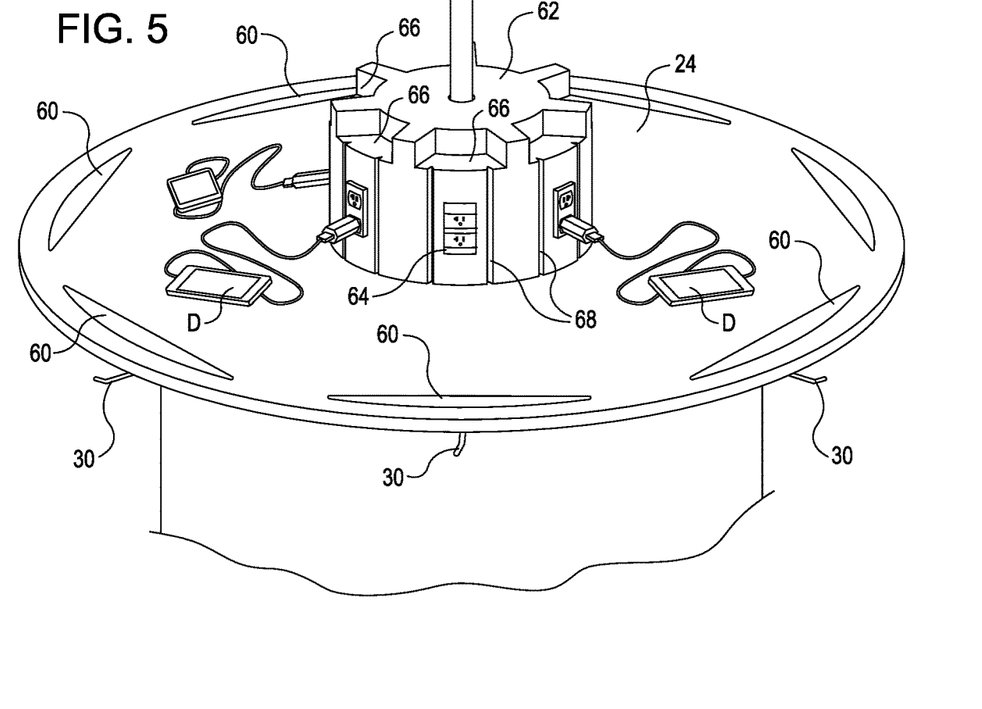
FIG. 5 shows a close-up view of a portion of the convertible table assembly of FIG. 1 in a table configuration.

FIG. 5 shows the convertible table assembly 20 in a table configuration, in which the bins 40 are not mounted to the tabletop assembly 24, and the tabletop assembly 24 is exposed. In the convertible table assembly 20 shown in the drawings, the tabletop assembly 24 is generally round and flat, however, other configurations, such as square, rectangular, hexagonal, polygonal or any other shape can be used.

In the embodiment shown in the drawings, tabletop bin recesses 60 are included along an outer perimeter of the tabletop assembly 24. These tabletop bin recesses 60 receive a proximal end portion of the bins 40 when the convertible table assembly 20 is in the item display configuration. In the illustrated embodiment, the bins 40 extend from the tabletop bin recesses 60 upwards towards the pole 26 in the item display configuration of the convertible table assembly 20. The tabletop bin recess 60 can be shaped to interface with the proximal end portion of the respective bin 40 to vertically support the proximal end portion and to inhibit horizontal movement of the proximal end portion relative to the tabletop assembly 24.

The tabletop assembly 24 includes a central mounting structure 62 that extends upward from the center of the tabletop assembly 24. In the embodiment shown in the drawings, the central mounting structure 62 includes outlets 64 mounted around the periphery of the central mounting structure 62. In addition to outlets or as an alternative to the outlets, USB ports and/or other charging and/or communication ports can be provided on the central mounting structure 62 and/or on a tabletop of the tabletop assembly 24. The communication ports can provide wired access to a network or the Internet.

For the embodiment shown in the drawings, the central mounting structure 62 includes a central mounting structure bin recess 66 positioned above each of the outlets 64. The central mounting structure bin recesses 66 are positioned so that they are radially aligned with the tabletop bin recesses 60. In this manner, the handles 50 can be positioned in the central mounting structure bin recesses 66 with the proximal end portion of the bins 40 being positioned in the tabletop bin recesses 60. In the illustrated embodiment, the central mounting structure bin recess 66 defines a bottom support surface that is in engagement with a distally protruding portion of a bin 40 while the convertible table assembly 20 is in the item display configuration to vertically support the distal end portion of the bin 40. In the illustrated embodiment, the central mounting structure bin recess 66 defines side support surfaces that block horizontal movement of the distal end portion of the bin 40 relative to the central mounting structure 62. Slots 68 can be provided on the central mounting structure 62 for receiving the rods 58. By positioning the bins 40 in this manner, the distal end portions of the bins 40 are higher than the proximal end portions of the bins 40, thereby presenting the food items 52 in a much more viewable manner, as shown in FIG. 1. In addition, the engagement of the rods 58 into the slots 68 enhances stability of the bins 20.

The convertible table assembly 20 of the present disclosure provides a number of benefits. A single piece of furniture can be utilized for presenting and selling food items or other items in a location, such as a lobby of a hotel. These food items can be displayed, for example, during a breakfast time period in a hotel so that the convertible table assembly 20 can be used to present breakfast items to hotel guests.

After the breakfast items are no longer needed, then the bins can be removed to expose the tabletop assembly 24 and to permit users to charge phones or other electronic devices. If desired, seats could be provided around the tabletop assembly 24 so that the convertible table assembly 20 could be utilized as a work desk.

In alternate embodiments and/or configurations, only a portion of the tabletop assembly 24 could be exposed so that food items 52 can be presented on a section of the tabletop assembly 24, while exposing some outlets 64 for charging or communication with devices (D). In addition, as indicated earlier, the bins 40 can present hot, cold, or room temperature food or other items.

In embodiments, the outlets 64 can be switched off when the convertible table assembly 20 is in the display configuration. In embodiments, installing the bins 40 may deactivate the outlets 64, such as by engaging a switch that turns off power to the outlets. In addition, the outlets could provide power for a refrigeration unit and/or a heating unit for one of more of the bins 40. In such embodiments, the bins can include a power cord and plug that is plugged into an outlet 64 when the bin is put into position.

Figure 6:
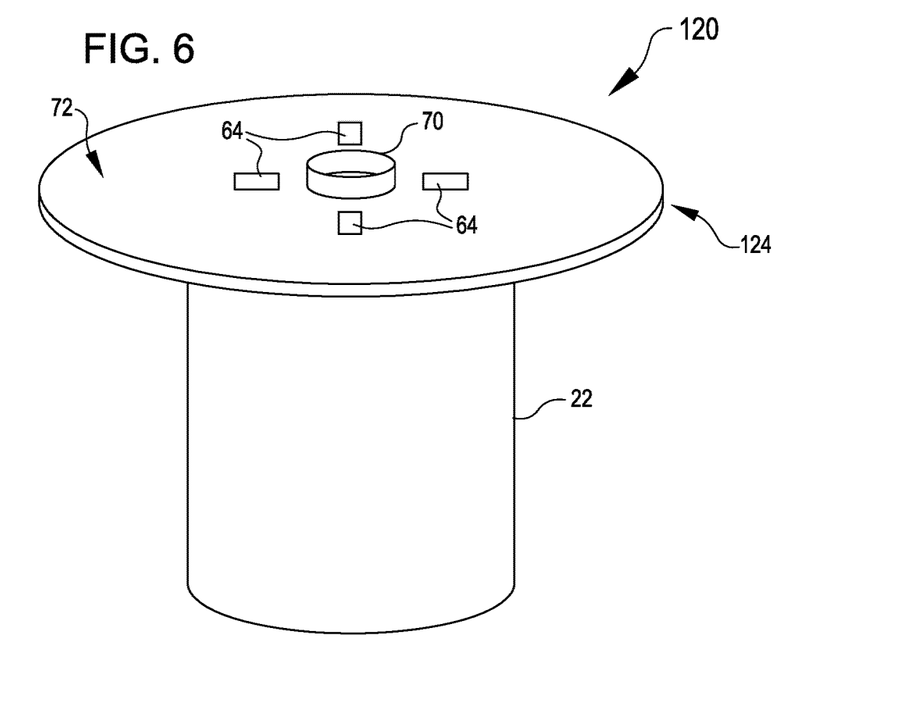
FIG. 6 shows another embodiment of a convertible table assembly.

FIG. 6 shows a convertible table assembly 120 in the table configuration. The convertible table assembly 120 is configured similar to the convertible table assembly 20, but includes bins 40-1, 40-2, 40-3 (shown in FIGS. 7, 8, and 9) that are configured similar to the bins 40, but with some differences described herein. The convertible table assembly 120 also employs a retention ring 70 as the central mounting structure 62 to couple the bins 40-1, 40-2, 40-3 together when the convertible table assembly 120 is in the item display configuration. The convertible table assembly 120 includes a tabletop assembly 124 mounted to a pedestal 22. The tabletop assembly 124 provides a tabletop surface 72 and includes any suitable number of power outlets 64 mounted flush to the tabletop surface 72. In addition to power outlets 64 or as an alternative to the outlets, USB ports and/or other charging and/or communication ports can be provided on the tabletop assembly 124. The communication ports can provide wired access to a network or the Internet.

Figure 7:
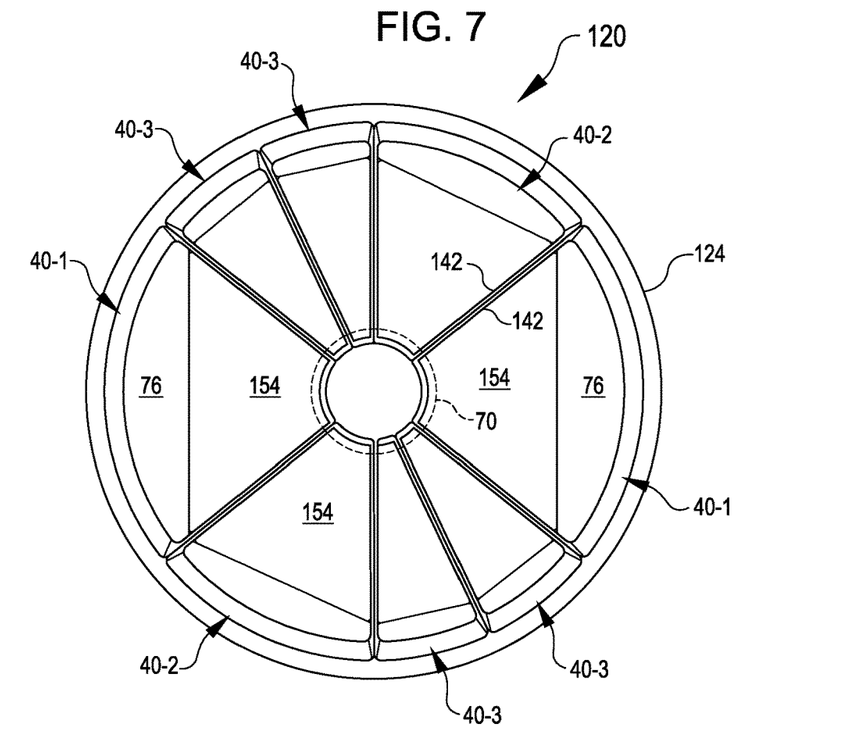
FIG. 7 is a plan view of the convertible table assembly of FIG. 6 in an item display configuration.

When the convertible table assembly 120 is in the item display configuration, the bins 40-1, 40-2, 40-3 are mounted to the tabletop assembly 124 and cover the power outlets 64 as shown in FIG. 7, which shows a plan view of the convertible table assembly in the item display configuration. The bins 40-1, 40-2, 40-3 mountable to, and demountable from, the tabletop assembly 124. In the illustrated embodiment, each of the bins 40-1 covers a 90 degree sector; each of the bins 40-2 covers a 45 degree sector; and each of the bins 40-3 cover a 22.5 degree sector. Accordingly, various combinations of the bins 40-1, 40-2, 40-3 can be employed since one bin 40-1 can be replaced by two bins 40-2 or by four bins 40-3, and vice-versa. The retention ring 70 is configured to support and retain distal end support legs 74 of each of the bins 40-1, 40-2, 40-3 when the convertible table assembly 120 is in the display configuration. The retention ring 70 is sized and shaped to engage the support legs 74 to form a combined assembly of the bins 40-1, 40-2, 40-3 to prevent inadvertent dislodgement of any single one of the bins 40-1, 40-2, 40-3 from the table top assembly 124. In the illustrated embodiment, the distal end support legs 74 of the bins 40-1, 40-2, 40-3 combine to form a segmented cylindrical wall that is surrounded and restrained by the retention ring 70 when the convertible table assembly 120 is in the display configuration. The bins 40-1, 40-2, 40-3 have radially extending sidewalls 142 that are in engagement with adjacent sidewalls 142 of adjacent bins when the convertible table assembly 120 is in the display configuration, thereby contributing to stabilization of the combination of the bins 40-1, 40-2, 40-3. The retention ring 70 can include a suitable retention mechanism that is operable to engage suitable features formed at the bottom of each of the support legs 74 so as to retain the support legs 74 to the retention ring 70. For example, each of the support legs 74 can include one or more retention features that protrude horizontally from the support legs 74 that can be engaged via a reconfigurable collar of the retention ring 70 so as to selectively either retain the support legs 74 to the retention ring 70 or enable separation of the support legs 74 from the retention ring 70 to facilitate demounting of the bins 40-1, 40-2, 40-3 from the tabletop assembly 124. In many embodiments, the retention ring 70 is not coupled with the tabletop assembly 124 and can be placed onto the tabletop assembly 124 during reconfiguration of the convertible table assembly 120 from the table configuration to the display configuration, and removed from the tabletop assembly 124 during reconfiguration of the convertible table assembly 120 from the display configuration to the table configuration. Alternatively, the retention ring 70 can be detachably coupled with the tabletop assembly 124 or permanently fixed to the tabletop assembly 124.

Figure 8:
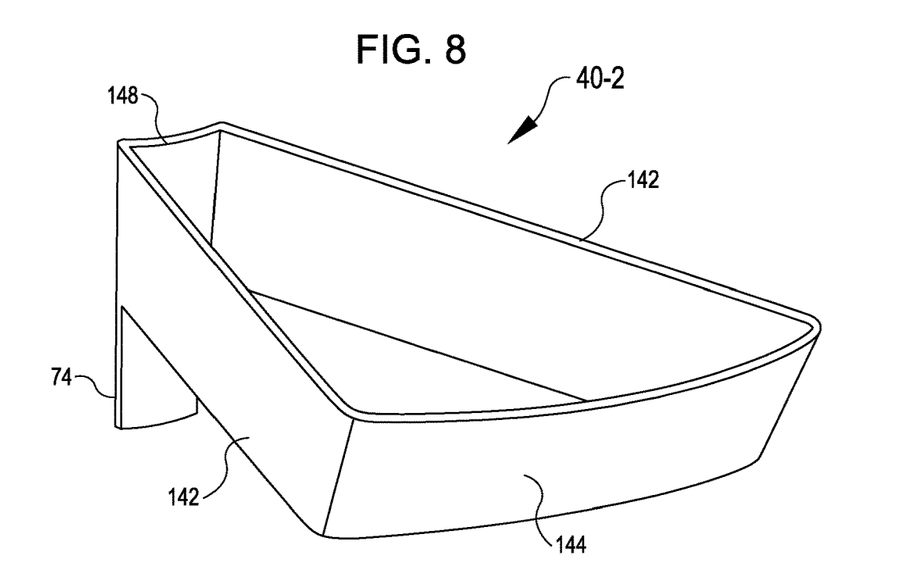
FIG. 8 shows a quarter-sector bin for the convertible table assembly of FIG. 6.
Figure 9:
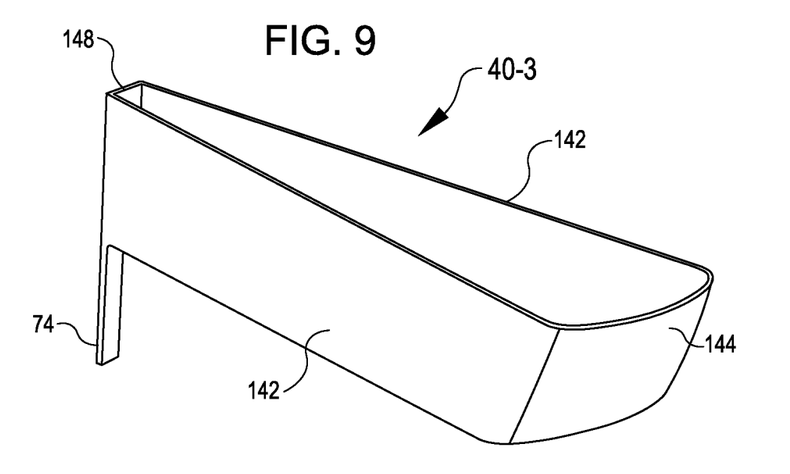
FIG. 9 shows a sixteenth-sector bin of the convertible table assembly of FIG. 6.

FIG. 8 shows a view of the bin 40-2. FIG. 9 shows a view of the bin 40-3. As shown in FIG. 6, each of the bins 40-1, 40-2, 40-3 has a sloping bottom wall 154 and a horizontal bottom surface 76 that rests upon the tabletop surface 72. Accordingly, the tabletop assembly 124 can be configured without recesses similar to the tabletop bin recesses 60 of the convertible table assembly 20, and therefore provide more flat horizontal surface when the convertible table assembly 120 is in the table configuration.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A convertible table assembly comprising:
   a tabletop assembly comprising one or more power outlets and/or one or more charging and/or communication ports;
   a central mounting structure; and
   bins that are detachably mountable to the tabletop assembly via coupling with the central mounting structure so as to cover the one or more power outlets and/or one or more charging and/or communication ports, the one or more power outlets and/or one or more charging and/or communication ports being exposed for connection to one or more electronic devices while the bins are not mounted to the tabletop assembly, at least one of the bins being configured to display items for selection and removal from the bin by a customer; wherein at least one of the bins has a distal end portion that is in engagement with the central mounting structure when the bin is mounted to the tabletop assembly and the central mounting structure extends upward from a tabletop surface of the tabletop assembly; the central mounting structure comprises slots; and the distal end portion comprises at least one distally protruding feature that is in engagement with a respective one of the slots while the bin is mounted to the tabletop assembly.

2. The convertible table assembly of claim 1, wherein at least one of the bins has a bottom wall that slopes downward from the distal end portion toward a proximal end portion of the bin while the bin is mounted to the tabletop assembly to enhance visibility of items displayed in the bin.

3. The convertible table assembly of claim 1, wherein:
the central mounting structure comprises a central mounting structure bin interface feature; and
the distal end portion comprises a distal end interface feature that is in engagement with the central mounting structure bin interface feature while the bin is mounted to the tabletop assembly to inhibit horizontal movement of the distal end portion relative to the tabletop assembly.

4. The convertible table assembly of claim 1, wherein:
each of the bins comprises a distal end support leg;
the central mounting structure comprises a retention ring; and
each of the respective distal end support legs is engaged with the retention ring while the respective bin is mounted to the tabletop assembly.

5. The convertible table assembly of claim 1, wherein at least one of the one or more power outlets and/or one or more charging and/or communication ports is disposed between an adjacent two of the slots.

6. The convertible table assembly of claim 1, wherein:
the central mounting structure comprises a central mounting structure bin recess shaped to receive a distally protruding portion of the distal end portion; and
the central mounting structure bin recess defines a bottom support surface that is in engagement with the distally protruding portion while the bin is mounted to the tabletop assembly to vertically support the distal end portion.

7. The convertible table assembly of claim 6, wherein the central mounting structure bin recess defines side support surfaces that block horizontal movement of the distal end portion while the bin is mounted to the tabletop assembly.

8. The convertible table assembly of claim 6, wherein the distally protruding portion comprises a handle for carrying the bin.

9. The convertible table assembly of claim 1, wherein the tabletop assembly comprises tabletop bin recesses shaped to receive and interface with a proximal end portion of a respective one of the bins to vertically support the proximal end portion and to inhibit horizontal movement of the proximal end portion relative to the tabletop assembly.

10. The convertible table assembly of claim 1, wherein:
the central mounting structure comprises a retention ring;
each of the bins comprises a distal end support leg that is in engagement with the retention ring while the bin is mounted to the tabletop assembly; and
each of the bins have side walls that extend radially away from the retention ring while the bins are mounted to the tabletop assembly.

11. The convertible table assembly of claim 10, wherein the bins encircle the retention ring while the bins are mounted to the tabletop assembly.

12. The convertible table assembly of claim 1, further comprising at least one bag holding member coupled with the tabletop assembly and configured to hold bags for carrying of one or more of items removed from the bins.

13. The convertible table assembly of claim 1, wherein at least one of the bins comprises a transparent cover that is reconfigurable between a closed configuration to isolate items in the bin from an environment surrounding the bin and an open configuration that enables placing of items into the bin and removal of items from the bin.

14. The convertible table assembly of claim 13, further comprising a refrigeration unit configured to refrigerate items in the bin.

15. The convertible table assembly of claim 14, wherein:
the refrigeration unit is mounted to the bin; and
the refrigeration unit comprises a power cord that is connectable to one of the one or more power outlets and/or charging and/or communication ports to receive power for operation of the refrigeration unit.

16. The convertible table assembly of claim 13, further comprising a heating unit mounted to the bin and configured to heat items in the bin, the heating unit comprising a power cord that is connectable to one of the one or more power outlets and/or charging and/or communication ports to receive power for operation of the heating unit.

* * * * *